(12) United States Patent
Heiskanen et al.

(10) Patent No.: US 8,728,273 B2
(45) Date of Patent: *May 20, 2014

(54) PROCESS FOR THE PRODUCTION OF A COMPOSITION COMPRISING FIBRILLATED CELLULOSE AND A COMPOSITION

(75) Inventors: Isto Heiskanen, Imatra (FI); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/696,511

(22) PCT Filed: May 11, 2011

(86) PCT No.: PCT/IB2011/052064
§ 371 (c)(1),
(2), (4) Date: Nov. 6, 2012

(87) PCT Pub. No.: WO2011/141877
PCT Pub. Date: Nov. 17, 2011

(65) Prior Publication Data
US 2013/0053454 A1    Feb. 28, 2013

(30) Foreign Application Priority Data
May 12, 2010   (SE) ...................................... 1050472

(51) Int. Cl.
*D21F 11/00*    (2006.01)
(52) U.S. Cl.
USPC ...................................................... 162/157.6

(58) Field of Classification Search
USPC .......... 162/157.6, 128, 169; 428/206; 106/447
See application file for complete search history.

(56) References Cited

U.S. PATENT DOCUMENTS

| 5,731,080 | A | 3/1998 | Cousin et al. |
| 2006/0289132 | A1 | 12/2006 | Heijnesson-Hulten |
| 2011/0186252 | A1* | 8/2011 | Subramanian et al. ....... 162/128 |
| 2013/0047893 | A1* | 2/2013 | Heiskanen et al. ........... 106/447 |

FOREIGN PATENT DOCUMENTS

| EP | 1036799 | 9/2000 |
| WO | 9318111 | 9/1993 |
| WO | 03033815 | 4/2003 |
| WO | 2004055267 | 7/2004 |
| WO | 2008033283 | 3/2008 |
| WO | 2010015726 | 2/2010 |

OTHER PUBLICATIONS

International Search Report issued in International Application No. PCT/IB2011/052064, dated Sep. 22, 2011.

* cited by examiner

*Primary Examiner* — Mark Halpern
(74) *Attorney, Agent, or Firm* — Greer, Burns & Crain, Ltd.

(57) ABSTRACT

The present invention relates to a process for the production of a composition wherein the process comprises pre-treating cellulosic fibers by mechanical, chemical and/or enzymatic treatment, mixing the pre-treated cellulosic fibers with pigments forming a dispersion and dispersing the dispersion of pre-treated cellulosic fibers and pigments whereby a composition comprising microfibrillated cellulose is formed. The invention further relates to a composition produced according to the process.

15 Claims, No Drawings

PROCESS FOR THE PRODUCTION OF A COMPOSITION COMPRISING FIBRILLATED CELLULOSE AND A COMPOSITION

This application is a 371 of PCT/IB2011/052064 filed 11 May 2011, which claims priority from Swedish Patent Application No. 1050472-8, filed May 12, 2010.

FIELD OF THE INVENTION

The present invention relates to process for the production of a composition comprising fibrillated cellulose and pigments. The invention also relates to such composition.

BACKGROUND

Fibrillated cellulosic fibers are material made from cellulose fibers, where the individual microfibrils of a fiber have been partly or totally detached from each other.

Microfibrillated cellulose (MFC) (also known as nanocellulose) is a one kind of fibrillated cellulose. MFC is normally very thin (~20 nm) and the length is often between 100 nm to 10 µm. However, the microfibrils may also be longer, for example between 10-100 µm.

Fibrillated cellulose can be produced in a number of different ways. It is possible to mechanically treat cellulosic fibers so that microfibrils are formed. It is also possible to produce fibrils from cellulose by the aid of different chemicals and/or enzymes which will break interfibrillar bonds or dissolve the fibers. One example of production of MFC is shown in WO2007091942 which describes production of MFC by the aid of refining in combination with addition of an enzyme.

Fibrillated cellulose can be used within many different fields. In the papermaking industry it can both be added to the surface of a paper or board or to the furnish. It has been shown that addition of fibrillated cellulose can increase the strength of a paper or board. When used in paper coating applications, it replaces the synthetic or natural binders such as starch. Since the fibrillated cellulose has a high thickening effect at low solid content, it can be used to as thickening agent, immobilizing agent, water retention aid, lubrication agent, dispersing agent and/or stabilizing agent. However, it can also be used in many other technical fields, such as the food industry, polymer or plastic industry, paint, ceramic, ink, composite industry (e.g. cement), rubber industry, cosmetic and pharmaceutical industry.

A dispersion comprising fibrillated cellulose, such as MFC, has the appearance of a highly viscous, shear-thinning transparent gel at low dry contents. Normally, a composition comprising fibrillated cellulose with a consistency of about 4% and higher is in the form of a very thick gel. Very fibrillated and fine material with high degree of polymerization might exhibit a gel like character at solid content about or less than 1 wt %. The gel has high viscosity making it very difficult to make it flow at low shear rates. This makes processing through pipes and pumps very difficult and thus also to distribute it to different end uses, for example to a surface of a paper or board substrate.

Thus, it is often undesirable to add a composition with low dry content during production of paper or board to the surface of a substrate since it takes a lot of energy to remove the added water, for example during drying of the substrate. Addition of a dispersion with low solid content and strongly shear thinning characteristics might also require a special coating unit in order to prevent too much penetration and unevenness during coating. Another reason to avoid unnecessary addition of water is to save transportation costs, water and environmental impact (carbon footprint).

One way to solve these problems is to dry the produced MFC before addition to a composition such as a for instance a pigment dispersion or to the paper machine wet end but this is a very energy consuming process and might have significant irreversible chemical and physical structural changes on the microfibrillated cellulose. Another problem is that wetting agent might be required to facilitate the re-dispersion of the dried MFC.

There is thus a need for a process for the production of a composition comprising fibrillated cellulose with high dry content in an improved way.

SUMMARY OF THE INVENTION

It is an object of the present invention to produce a composition comprising fibrillated cellulose and a pigment in an improved way.

It is another object of the present invention to provide a composition comprising fibrillated cellulose and a pigment with improved rheology properties at high consistencies.

These objects and other advantages are achieved by the process according to described herein below. The invention relates to a process for the production of a composition wherein the process comprises pre-treating cellulosic fibers by mechanical, chemical and/or enzymatic treatment, mixing the pre-treated cellulosic fibers with a pigment forming a dispersion, dispersing the dispersion of pre-treated cellulosic fibers and pigment whereby a composition comprising fibrillated cellulosic fibers are formed.

The consistency of the pre-treated fibers mixed with pigments may be high, preferable between 1-50% by weight. Increasing the consistency of the pre-treated fibers improves the possibility to produce a final composition with high consistency.

The consistency of the composition may be high, preferable between 10-70% by weight. By the process according to the invention it is possible to produce a composition comprising fibrillated cellulose and pigments with high consistency at the same time as the rheology properties of the composition is good.

The temperature during the dispersing is preferable increased. It has been shown that by increasing the temperature during, either by heating or due to the temperature increase during the dispersing, it is possible to produce grafted fibrillated cellulose in a controlled way.

The dispersing is preferable done in a conventional dispersing or mixing equipment. There is thus no need for investments of additional equipment.

The fibrillated cellulose formed is preferable microfibrillated cellulose. When the pre-treated cellulosic fibers are dispersed together with the pigment, the fibers will be even further fibrillated forming a finer cellulosic material. This is due to the friction between the fibers and the pigments which occur during the dispersing. It is thus possible to produce a composition comprising microfibrillated cellulose in an improved way.

The pre-treated fibers may be cellulose derivates, such as carboxymethyl cellulose (CMC), hydroxypropyl cellulose (HPC), hydroxyethyl cellulose (HEC) or ethyl hydroxyethyl cellulose (EHEC). The cellulose derivates preferable has a low degree of substitution (DS) value, if CMC is used the DS value is preferable below 0.4. Higher DS values may dissolve the cellulose derivates when it is mixed with water or other liquids.

The invention further relates to a composition comprising fibrillated cellulose produced according to the process mentioned above wherein the composition further comprises pigments.

The formed fibrillated cellulose of the composition may be grafted. By grafting the fibers it is possible to alter the properties of the fibers, such as charge and viscosity, stimulative properties, solubility and film forming ability, thus giving the composition different properties.

The composition may comprise 0.1-95% by weight by amount of pigment of fibrillated cellulose. The amount of fibrillated cellulose of the composition depends on the end use of the composition.

The composition may also comprise mono-, di- or oligo-saccharides. It has been shown that short saccharides may work as a dispersant making it possible to further increase the consistency of the composition without causing rheology problems.

The amount of pigments in the composition depends on the end use of the composition. The pigments may increase the printing properties of a paper or board if the composition is used as a coating color. If used as a barrier, the pigment may improve oxygen transmission rates, water vapor transmission rates, light barrier, odor barrier, processability and/or costs.

The composition preferable has a dry content of 10-70% by weight. It is possible to provide the composition with high consistency even though it comprises fibrillated cellulose which normally contributes to problems with rheology of the composition, making it very difficult to handle.

The fibrillated cellulose may be microfibrillated cellulose or cellulose derivates, such as CMC, HEC or EHEC. Depending on the end use of the composition it is possible that the fibrillated fibers of the composition comprise microfibrillated cellulose or cellulose derivates. The fibrillated cellulose may be used for increasing the strength of for example a paper or board.

The cellulose derivate preferable has a low degree of substitution, e.g. if CMC is used the DS value is preferable below 0.4. This is due to that the cellulose derivate may dissolve at higher DS values, thus making it difficult to form fibrillated cellulose derivates. Normally cellulose derivates with low DS values are not used. The present invention makes it possible to provide a composition with fibrillated cellulose derivates and thus use these derivates as strength enhancement.

DETAILED DESCRIPTION

By producing a composition according to the invention it is possible to increase the consistency of the composition without deferring the rheology properties.

The process also makes it possible to produce a composition comprising fibrillated cellulose, such as microfibrillated cellulose in a very cost efficient way.

The composition comprises fibrillated cellulosic fibers. The cellulose fibers are pre-treated and the pre-treatment can be done mechanically, chemically and/or enzymatically. The purpose of the pre-treatment is to pre-activate or pre-fibrillate the fibers making them more active and reactive to following treatments.

It is preferred that the pre-treatment is done by at least partly enzymatic treatment, preferable in combination with mechanical and/or chemical treatments. During enzymatic treatment cellulosic fibers will be decomposed, released or modified, forming pre-treated fibers and at the same time mono-, di- or oligo-saccharides will be formed. It has been shown that mono-, di- or oligo-saccharides may work as a dispersant in the composition, making it possible to increase the consistency of the composition.

The pre-treatment is preferable done at a high consistency. It is possible to pre-treat cellulosic fibers at a high consistency and still fibrillate them to some extent. It is preferred that the consistency of the pre-treated fibers, i.e. the slurry comprising pre-treated fibers, are between 1-50% by weight, even more preferred 15-50% by weight. By increasing the consistency of the pre-treated fibers it is easier to produce a composition with high consistency since less water is added. A big advantage with the present invention is that is it possible to produce the composition on-site in for example the mill or a plant. It is thus possible to pre-treat the cellulosic fibers in order to fibrillate them and then transport the pre-treated fibers to the mill or plant. It is thus an advantage that it is possible to increase the consistency of the pre-treated fibers since the amount of water transported is reduced. The extent of the pre-treatment depends on the end use and on how long time the subsequent dispersing is going to last. Some mill or plants have processes which allow mixing or dispersing of the pigments for a long time and the pre-treatment may then be quite light. However, others do not have time for dispersing during a long time and the pre-treatment must then be more thorough.

The pre-treated fibers are thereafter mixed with a pigment forming a dispersion. The pigment may either be dried or in the form of a slurry. The pre-treated fibers and the pigment are dispersed or mixed which results in that fibrillated cellulose fibers are formed. The pigments will collide with the fibers during the dispersing and thus fibrillate the fibers even further. This effect can be seen as a change in viscosity of the dispersion comprising pre-treated fibers and pigments during the dispersing. The formed fibrillated cellulose is often used in order to increase the strength on the end product in which the composition is used. However, it can also be used to give other physical and chemical properties to the end product such as increasing the water holding capacity, drying properties, processability, barrier or thermal properties. In bricks and pottery the presence of fibers are burned during the process making the end product to contain air and thus decreased the weight of the product. It is in this way possible to provide the product with excellent sound barrier properties and temperature barrier properties.

The dispersing thus results in that a composition comprising both fibrillated cellulose and pigments are formed. The composition can be produced with a high consistency without the rheology problems normally seen in compositions comprising fibrillated cellulose. Normally, MFC with low consistency and high viscosity can be added to a pigment dispersion but the final solid content of such dispersion is relatively low. However, by mixing pre-treated fibers with a pigment, it is possible to achieve a composition with high consistency, preferable with a consistency of between 10-70% by weight. In the process according to the invention, it is possible to complete a fibrillation of the pre-treated fibers and at the same time produce a dispersion comprising fibrillated cellulose and pigments in a very economical favorable way. By forming fibrillated cellulose in the presence of pigments the fibers ability to bundle and thus increase the viscosity of a composition is prevented. It is thus possible to increase the consistency of the composition according to the invention.

The temperature during the dispersing may be increased, preferable above 70-80° C., either by heating or as a result of the dispersing. At higher solid contents, more energy is transferred into heat and hence simultaneous grafting on either fibrillated cellulose or pigments can be made of either separately added components such as CMC or the fibrillated or removed components from the fibers during the described fibrillation process. During the dispersing the production of fibrillated fibers may lead to that the temperature of the composition increases which also may facilitate grafting. Normally such grafting is made in separate steps whereas this allows both particle size control and grafting in one process step.

Yet another big advantage with the present invention is that no new or extra equipment for the process is needed. The dispersing is preferable done in a conventional dispersing or mixing equipment which already is used when producing compositions comprising pigments. There is thus no need for investments of additional equipment. Consequently, it is possible to produce a composition comprising fibrillated cellulose and pigments in equipments which already is available at a plant.

The fibrillated cellulose formed is preferable microfibrillated cellulose. When the pre-treated cellulosic fibers are dispersed together with the pigments, the fibers will be even further fibrillated forming a finer material. This is due to the friction during the dispersing or mixing between the fibers and the pigments. It is thus possible to produce a composition comprising microfibrillated cellulose. By changing the conditions of the pre-treatment and the dispersing, e.g. time, temperature or pH, the length of the fibers and the extent of the fibrillation of the fibers can be controlled. In this way it is possible to alter the process so that microfibrillated cellulose is formed. It is also possible to produce a very fine microfibrillated cellulose or nanocellulose by the process according to the invention.

The pre-treated fibers may also be cellulose derivates, such as carboxymethyl cellulose (CMC), hydroxypropyl cellulose (HPC), hydroxyethyl cellulose (HEC), ethyl hydroxyethyl cellulose (EHEC), or intermediate products or rejects of cellulose derivates. The cellulose derivates preferable has a low degree of substitution (DS) value. If CMC is used the DS value is preferable below 0.4. Higher DS values will dissolve the cellulose derivates when it is mixed with water or other liquids and hence no fibrillation will occur. Normally cellulose derivates with low DS values are not used. Consequently, the present invention makes it possible to provide a use for cellulose derivates with low DS value and thus use these derivates as for example strength enhancements.

The composition produced according to the invention will have improved rheology properties even though the consistency is high. Normally, the viscosity of a composition comprising fibrillated cellulose and pigments will increase. This is due to that the presence of fibrillated cellulose, as stated above, easily forms a gel and has very shear thinning properties.

The composition may comprise 0.1-95% by weight by amount of pigment of fibrillated cellulose. The amount of fibrillated cellulose of the composition depends on the end use of the composition and can in some certain applications be much higher such as barrier films or paints.

The composition may comprise mono-, di- or oligo-saccharides. It has been shown that the presence of short saccharides works as a dispersant making it possible to further increase the consistency of the composition without causing rheology problems. The short saccharide may be a sugar, preferable glucose, xylane, mannose, mannan and/or cellodextrin such as cellobiose, cellotriose, cellotetrose, cellopentose, cellohexose and/or cello-oligosachride.

The amount of pigments depends on the end use of the composition. However, too low amount will not give sufficient fibrillation of the fibers. The pigments may give a fiber based substrate good printing properties, good visual appearance and/or other functionalities like optical or sensing properties.

The pigment of the composition is preferable ground or precipitated calcium carbonate, calcinated clay, talcum, kaolin, bentonite or other swelling clays, Al2O3, aluminium hydroxide (ATH), plastic pigments, silica, gypsum, titanium dioxide, organic pigments, such as starch pigments or calcium stearate dispersions and/or a mixture of any of these pigments.

The composition may also comprise dispersants or lubricants. It is preferred to add polyacrylic acids, acrylate copolymers, sodium salts of acrylic acids, polyacrylic acids, maleic acid, polymaleic acids, sodium citrate, sodium malonate, sodium succinate, sodium malate, sodium glutamate, polyphosphates, calcium stearate, PEG and/or triglycerides, sodium hexametaphosphate (SHMP), polyvinyl alcohol, polyvinyl aceate, PVOH/Ac, sodium n-silicate, sodium polyaluminate, sodium tetraborate, bipolar organic dispersants like ethylene glucole, methanol, methyl amine, propyl amine, aniline, or polypolar dispersants like polyethylene oxides and polyethylene derivatives.

The composition may be used as a surface size recipe or coating color which is added to the surface of a fiber based substrate. The composition comprises both fibrillated cellulose, which will increase the strength of the coating, and pigments which will improve the surface properties of the substrate. The composition can also be used in dispersion barriers coatings. It is also possible to add the composition to a fiber based furnish, for example to a furnish during the wet end of a paper or paperboard machine. In this way the composition will be used as filler and will both increase the strength of the fiber based product as well as it will improve the surface properties of the substrate. Other possible end uses may be as a component in paint, cement, ceramics, food, cosmetics, composites, pharmaceuticals, asphalt, rubber or other possible end uses where a composition comprising fibrillated cellulose and pigment with good rheology properties at a high dry content can be used.

The composition may also contain traditional binders such as latex, or starch, as well as other coating color ingredients as optical brighteners, cross-linkers, rheology modifiers, pigment extenders, lubricants, dispersants, de-foaming agents, etc Fibers that has been fibrillated and which have microfibrils on the surface and microfibrils that are separated and located in a water phase of a dispersion or composition are also included in the definition microfibrillated cellulose. The term microfibrillated cellulose (MFC) does include, as stated above nanocellulose, and also cellulose nanocrystallities, cellulose whiskers, fines of fibers and/or blends thereof.

The fibrillated cellulosic fibers can be produced from any type of cellulosic fibers, preferable wood fibers, such as softwood or hardwood fibers. However, other raw materials may also be used, such as bamboo, agricultural products, elephant grass and other materials comprising cellulose fibers.

The invention claimed is:

1. A process for the production of a composition wherein the process comprises the steps of:
   pre-treating cellulosic fibers by mechanical, chemical and/or enzymatic treatment,
   mixing the pre-treated cellulosic fibers with a pigment forming a dispersion,
   dispersing the dispersion of pre-treated cellulosic fibers and pigments to form a composition comprising microfibrillated cellulose wherein the microfibrillated cellulose is formed by the dispersing.

2. The process according to claim 1 wherein the consistency of the pre-treated fibers is between 1-50% by weight.

3. The process according to claim 1 wherein the consistency of the composition is between 10-70% by weight.

4. The process according to claim 1 wherein the temperature during the dispersing is increased to a temperature above 70° C.

5. The process according to claim 1 wherein the dispersing is done in a conventional dispersing or mixing equipment.

6. The process according to claim 1 wherein the pre-treated fibers are cellulose derivates.

7. The process according to claim 6 wherein the cellulose derivates is carboxymethyl cellulose (CMC) and has a low degree of substitution.

8. The process according to claim 7 wherein the low degree of substitution is below 0.4.

9. The process according to claim 6 wherein the cellulose derivates comprise hydroxypropyl cellulose (HPC), hydroxyethyl cellulose (HEC) or ethyl hydroxyethyl cellulose (EHEC).

10. The process according to claim 1 wherein the temperature is increased during the dispersing.

11. The process according to claim 10 wherein the temperature is increased by heating.

12. The process according to claim 1 wherein mixing the pre-treated cellulosic fibers with the pigment forming the dispersion further comprises mixing mono-saccharides, di-saccharides, or oligo-saccharides with the pre-treated cellulosic fibers, and the pigment.

13. The process according to claim 12 wherein the mono-saccharides, di-saccharides, or oligo-saccharides are formed by enzymatic treatment.

14. The process according to claim 12 wherein the mono-saccharides, di-saccharides, or oligo-saccharides comprise sugars, cellodextrins, or both.

15. The process according to claim 12 wherein the mono-saccharides, di-saccharides, or oligo-saccharides comprise glucose, xylane, mannose, mannin, cellobiose, cellotriose, cellotetrose, cellopentose, celloheose, cello-oligosaccharide, or combinations thereof.

* * * * *